NEGATIVE-RESISTANCE CIRCUIT ARRANGEMENT

Filed June 17, 1964 2 Sheets-Sheet 1

INVENTOR.
OEY SIK POO
BY
Frank R. Jerifari
AGENT

NEGATIVE-RESISTANCE CIRCUIT ARRANGEMENT

Filed June 17, 1964 2 Sheets-Sheet 2

INVENTOR
OEY SIK POO
BY
Frank R. Jifari
AGENT 3,358,153
NEGATIVE-RESISTANCE CIRCUIT ARRANGEMENT Oey Sik Poo, Hamburg-Wandsbek, Germany, assignor to North American Philips Company, Inc., New York, N.Y., a corporation of Delaware
Filed June 17, 1964, Ser. No. 375,906
Claims priority, application Germany, June 21, 1963, P 32,046
7 Claims. (Cl. 307—88.5)

ABSTRACT OF THE DISCLOSURE

A negative resistance circuit consists of three parallel branches. One branch consists of the collector-emitter path of a first transistor. The second branch consists of the collector-emitter path of a second transistor connected in shunt with the base-emitter path of the first transistor, with a resistor connected between the collector of the second transistor and a terminal of the circuit. The third branch consists of a resistive voltage divider connected in shunt with the collector-emitter path of the first transistor and having a tap connected to the base of the second transistor.

The invention relates to a negative-resistance circuit arrangement comprising two transistors of the same conductivity type the emitters of which are connected to each other, while the collector of one transistor is connected to the base of the other transistor. Such circuit arrangements may be used, for example, for reducing the damping in electric circuits. It is of importance that the negative resistance retains its ohmic nature in a very wide frequency range.

The invention provides a simple solution of this problem and is characterized in that the base of the first transistor is connected to a tapping on a voltage divider connected in parallel with the emitter-collector path of the other transistor, the collector of the latter transistor being connected through a resistor to its base.

The invention will now be described more fully with reference to the accompanying drawings in which.

Figure 1:
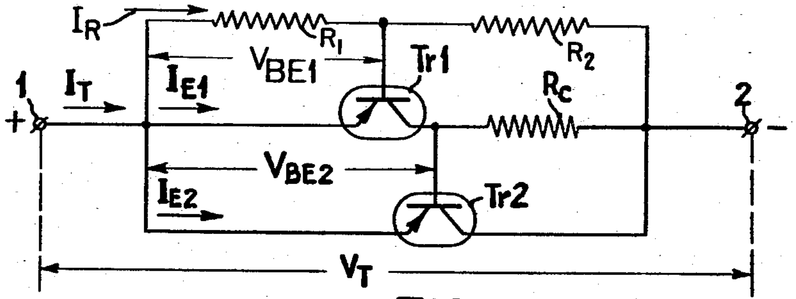
FIG. 1 is a circuit diagram showing the basis elements of a negative-resistance circuit arrangement in accordance with the invention.

The circuit arrangement shown in FIG. 1 comprises two transistors $Tr_1$ and $Tr_2$, the collector of the first transistor being connected to the base of the second transistor. The base of transistor $Tr_1$ is connected to a tapping on a voltage divider constituted by resistors $R_1$ and $R_2$ and connected in parallel with the emitter-collector path of transistor $Tr_2$. Furthermore, a resistor $R_c$ is connected between the collector and the base of transistor $Tr_2$. By a suitable choice of the said resistors with respect to the given characteristic curves of the transistors there is obtained between an input terminal 1 and an output terminal 2 between which a direct supply voltage is applied a current-voltage characteristic curve which, as will be proved hereinafter, includes a negative-resistance portion.

Figure 2:
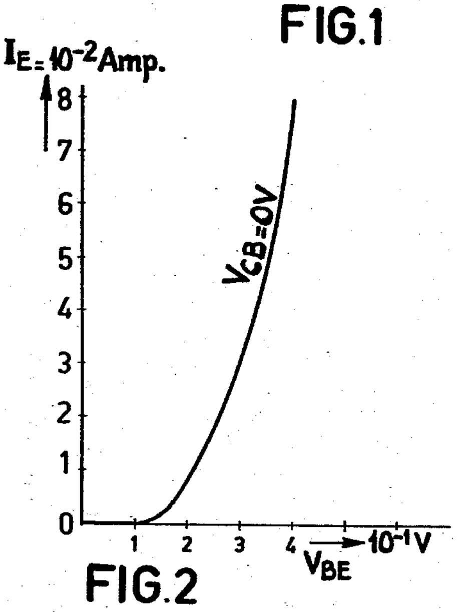
FIGS. 2 and 4 show characteristic curves illustrating the operation of a circuit of FIG. 1.
Figure 3:
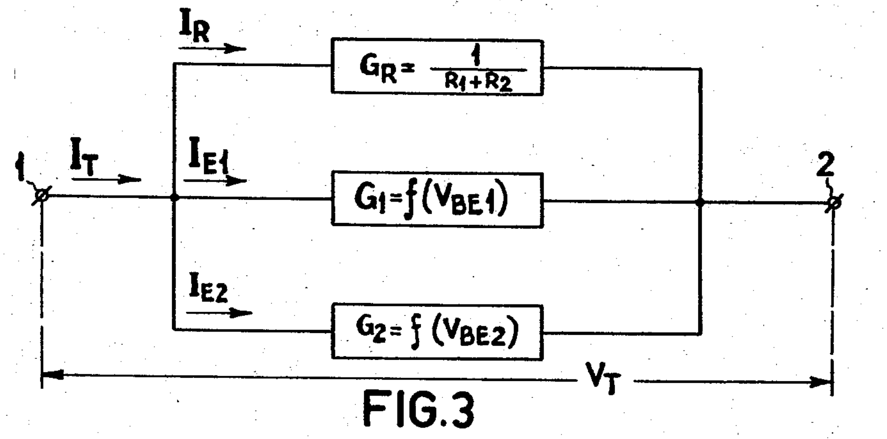
FIG. 3 shows an equivalent circuit diagram of the arrangement of FIG. 1.

FIG. 2 represents the emitter current $I_E$ as a function of the emitter-base voltage $V_{BE}$ of a conventional junction transistor. It will be seen that the voltage $V_{BE}$ must exceed a given threshold value before the emitter current starts flowing; in practice, this value may amount to a few hundreds mv. In principle, the circuit arrangement shown in FIG. 1 comprises the parallel combination of three conductances $$G_R=\frac{1}{R_1+R_2}$$

which is constituted by the voltage divider $R_1$, $R_2$, $G_1=f(V_{BE1})$, which is constituted by the series combination of the transistor $Tr_1$ and the resistor $R_c$, and finally $G_2=f(V_{BE2})$, which is constituted by the transistor $Tr_2$ (see FIG. 3). When a voltage $V_T$ is applied between the terminals 1 and 2 the said three conductances pass currents which are equal to $I_R$, $I_{E1}$ and $I_{E2}$, respectively.

Figure 4:
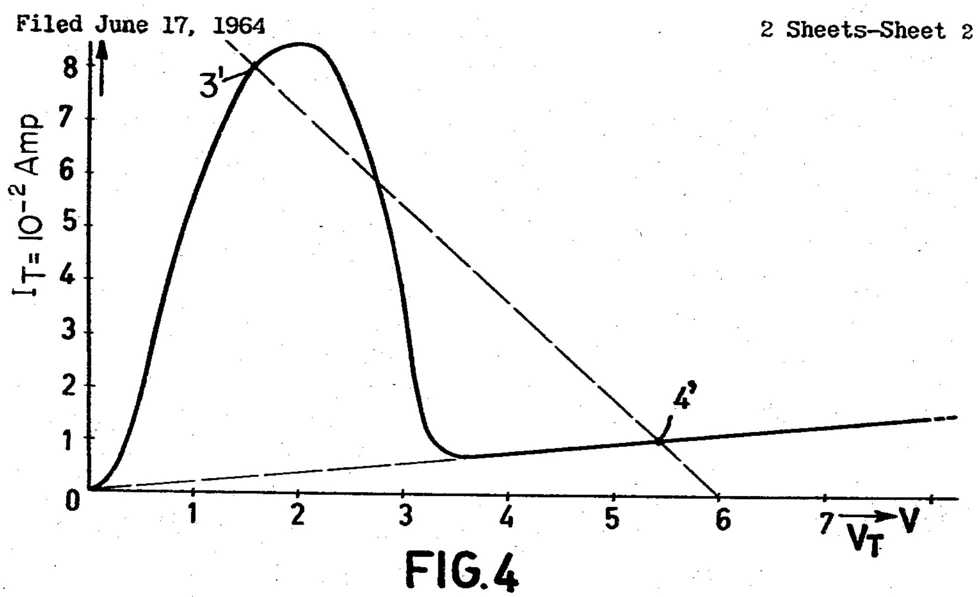

FIG. 4 represents as a function of the voltage $V_T$ the overall current $I_T$ obtainable with such a circuit arrangement. In this current characteristic curve the following sections can be distinguished. The transistors $Tr_1$ and $Tr_2$ are cut off at a value of $V_T$ which is lower than the said threshold value. When the voltage $V_T$ increases the emitter-base voltage of the transistor $Tr_2$ exceeds the threshold voltage at a given instant so that this transistor becomes conductive. Since as a result of the presence of the voltage divider $R_1$, $R_2$ a lower voltage is applied to the base of transistor $Tr_1$, this transistor does not yet become conductive at this instant. In this condition $Tr_2$ has a high conductivity as a result of a suitable choice of the resistors so that a very strong current $I_{E2}$ may flow.

With a further increase in the overall voltage $V_T$ finally the threshold voltage in the emitter-base path of transistor $Tr_1$ is also exceeded, so that this transistor becomes conductive. However, the current $I_{E1}$ through the transistor $Tr_1$ produces a voltage drop across the resistor $R_c$, as a result of which the emitter-base voltage $V_{BE2}$ of the transistor $Tr_2$ initially no longer increases and finally even decreases. The collector of transistor $Tr_1$ is then at a potential at which the collector-base junction of this transistor is driven in the forward direction. Consequently, the current $I_{E2}$ through the transistor $Tr_2$ decreases considerably while the current though the transistor $Tr_1$ increases, it is true, but cannot exceed the value $V_T/R_c$.

Consequently, the overall current strongly decreases, which corresponds to the nature of a negative resistance. In the end, the conductivity of the transistor $T_2$ has decreased to an extent such that the current $I_{E2}$ is negligible with respect to $I_{E1}$ and $I_R$, whilst the currents $I_{E1}$ and $I_r$ still slowly increase with the voltage $V_T$. In this situation, practically only $$G_R=\frac{1}{R_2} \text{ and } G_1=\frac{1}{R_c}$$

are significant.

In a practical embodiment use was made of transistors of the type OC 72. (The equivalent of the OC 72 is 2N281.) The resistors $R_1$, $R_2$ and $R_c$ were 1.2 kΩ, 10 kΩ and 560Ω, respectively. The numerical values given in the characteristic curve of FIG. 4 relate to this proportioning of the circuit arrangement. In order to obtain certain further effects it may be desirable to insert small resistors into one or both emitter leads.

Figure 5:
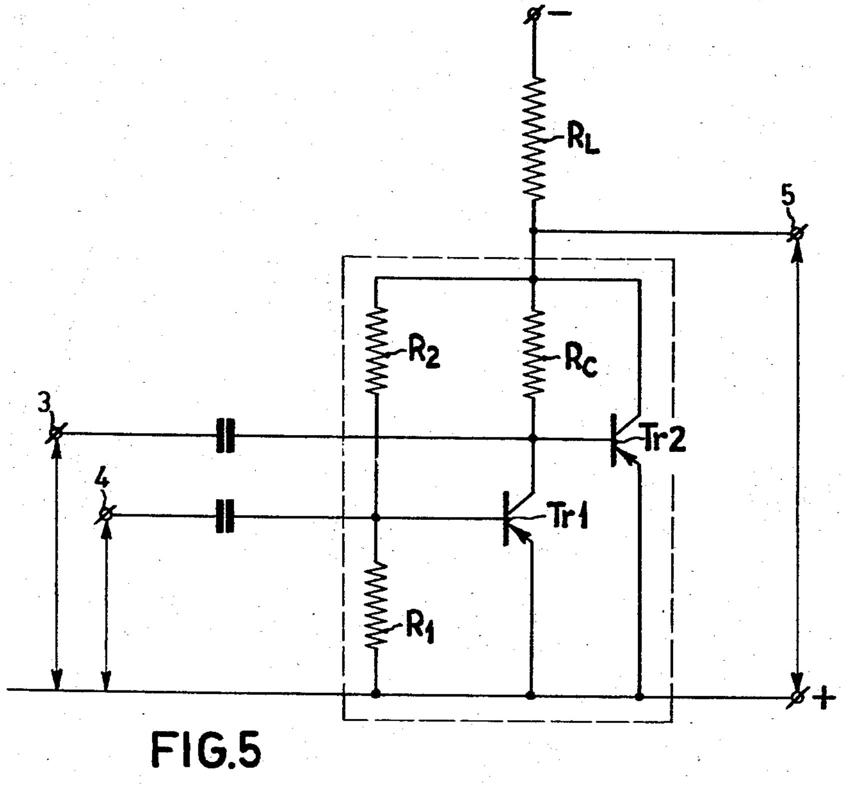
FIG. 5 shows an embodiment of the invention.

FIG. 5 shows an embodiment of the invention used in a trigger arrangement. The two transistors $Tr_1$ and $Tr_2$ and the resistors $R_1$, $R_2$ and $R_c$ are arranged in a manner similar to that shown in FIG. 1. The resulting negative resistance is connected in series with a load resistor $R_L$. This load resistor can be switched into circuit and out of circuit in that with due regard to the correct polarity triggering pulses are applied through input terminals 3 and 4 to the bases of the transistors $Tr_2$ and $Tr_1$, respectively. The load line corresponding to the resistor $R_L$ is represented in FIG. 4 by a broken line; this curve has two stable points of intersection 3′ and 4′ with the $I_T$–$V_T$ characteristic curve and an intermediate point of intersection in which the arrangement is unstable. Thus, for example, loads may be switched into circuit and out of circuit or a voltage corresponding to the state of a trigger arrangement may be taken from the output terminal 5.

What is claimed is:

1. A two terminal circuit that exhibits a negative current-voltage characteristic region between first and second positive current-voltage characteristic regions, comprising first and second terminals forming an input and output respectively, first, second and third branches connected in parallel between said first and second terminals, said first branch comprising a first transistor having its emitter connected to said first terminal, and means connecting the collector of said first transistor to said second terminal, said second branch comprising a second transistor having its emitter connected to said first terminal, and resistor means connected between the collector of said second transistor and said second terminal, said first and second transistors being of the same conductivity type, said third branch comprising a resistive voltage divider having a tap, means connecting the base of said first transistor to the collector of said second transistor, means connecting the base of said second transistor to said tap whereby said divider provides the sole direct current bias for said second transistor, a source of voltage, and means applying said voltage between said first and second terminals, whereby the voltage between said first and second terminals is variable, the resistances of said voltage divider being proportioned to hold said second transistor in a cut off state in a first range of voltage between said first and second terminals whereby only said first transistor is conductive, and to bias said second transistor to a conductive state for voltages in a second range between said terminals above said first range, whereby the collector current flow of said second transistor through said resistor means decreases the base current of said second transistor, and in a portion of said second range increasing voltages between said terminals produce a decrease in the collector current of said first transistor that is greater than the increase in collector current of said second transistor.

2. A circuit that exhibits a negative resistance characteristic between first and second terminals forming an input and output respectively, comprising first and second transistors of the same conductivity type, means connecting the emitters of said transistors to said first terminal, means connecting the collector of said first transistor directly to said second terminal, means connecting the collector of said second transistor directly to the base of said first transistor, a resistive voltage divider connected between said first and second terminals, said voltage divider having a tap connected to the base of said second transistor, and resistor means connected between the collector and emitter of said first transistor, the resistors of said divider being proportioned to hold said second transistor cut off for a first range of voltages between the emitter and collector of said first transistor at which said first transistor is conductive, and to bias said second transistor to a conductive state at a second range of voltages between the emitter and collector of said first transistor above said first range, whereby second transistor collector current increases resulting from increases in emitter-collector voltage of said first transistor are less than first transistor collector current decreases in a portion of said second range.

3. A two port circuit that exhibits a negative resistance characteristic, comprising a source of potential, a first transistor, means connecting said source between the emitter and collector of said first transistor, a second transistor of the same conductivity type as said first transistor having its collector connected directly to the base of said first transistor, means connecting the emitter of said second transistor to the emitter of said first transistor, a resistive voltage divider connected between the emitter and collector of said first transistor, said divider having a tap connected to the base of said second transistor for providing the sole direct current bias for said second transistor, and resistor means connected between the collector and base of said second transistor, said divider being proportioned to hold said second transistor cut off for a first range of emitter-collector voltages of said first transistor during which said first transistor is conductive, and to bias said second transistor to a conductive state for a second range of emitter-collector voltages, of said first transistor above said first range, whereby a negative resistance characteristic occurs between the emitter and collector of said first transistor during a portion of said second range of emitter-collector voltages of said first transistor.

4. A circuit that exhibits a negative resistance characteristic comprising first and second terminals forming an input and output respectively, a source of potential, means applying said potential between said first and second terminals, first and second transistors of the same conductivity type, means connecting the emitter of said first transistor to said first terminal, means connecting the emitter of said second transistor to said first terminal, resistor means having one end connected to the collector of said first transistor, means connecting the other end of said resistor means to the base of said first transistor and the collector of said second transistor, whereby the only current flow through said resistor means is the base current of said first transistor and collector current of said second transistor, means connecting the collector of said first transistor to said second terminal, and a resistive voltage divider connected between said first terminal and the collector of said first transistor, said divider having a tap providing the sole direct bias for said second transistor, said divider being proportioned to hold said second transistor cut off for a first range of emitter-collector voltages of said first transistor during which said first transistor is conductive, and to bias said second transistor to a conductive state for a second range of emitter-collector voltages of said first transistor above said first range, whereby a negative resistance characteristic occurs between the emitter and collector of said first transistor during a portion of said second range of emitter-collector voltages of said first transistor.

5. A bistable circuit comprising a negative resistance circuit having first and second terminals, and a source of voltage and an output resistor serially connected between said first and second terminals, said negative resistance circuit comprising a first transistor, means connecting the emitter of said first transistor to said first terminal, means connecting the collector of said first transistor to said second terminal, a second transistor of the same conductivity type as said first transistor, means connecting the emitter of said second transistor to said first terminal, resistance means connected between the base and collector of said first transistor, means connecting the collector of said second transistor to the base of said first transistor, a resistive voltage divider connected between said first terminal and the collector of said first transistor, and a tap on said divider connected to the base of said second transistor.

6. The bistable circuit of claim 5 comprising a source of a triggering potential connected to the base of said first transistor.

7. The bistable circuit of claim 5 comprising a source of a triggering potential connected to the base of said second transistor.

References Cited

UNITED STATES PATENTS 3,050,642 8/1962 Rogers et al. -------- 307—88.5

JOHN S. HEYMAN, *Primary Examiner.*